May 4, 1965 R. B. BLIZARD 3,181,645
ACOUSTIC WELL LOGGING APPARATUS
Original Filed Aug. 6, 1959 4 Sheets-Sheet 1

INVENTOR.
ROBERT B. BLIZARD
BY
ATTORNEYS

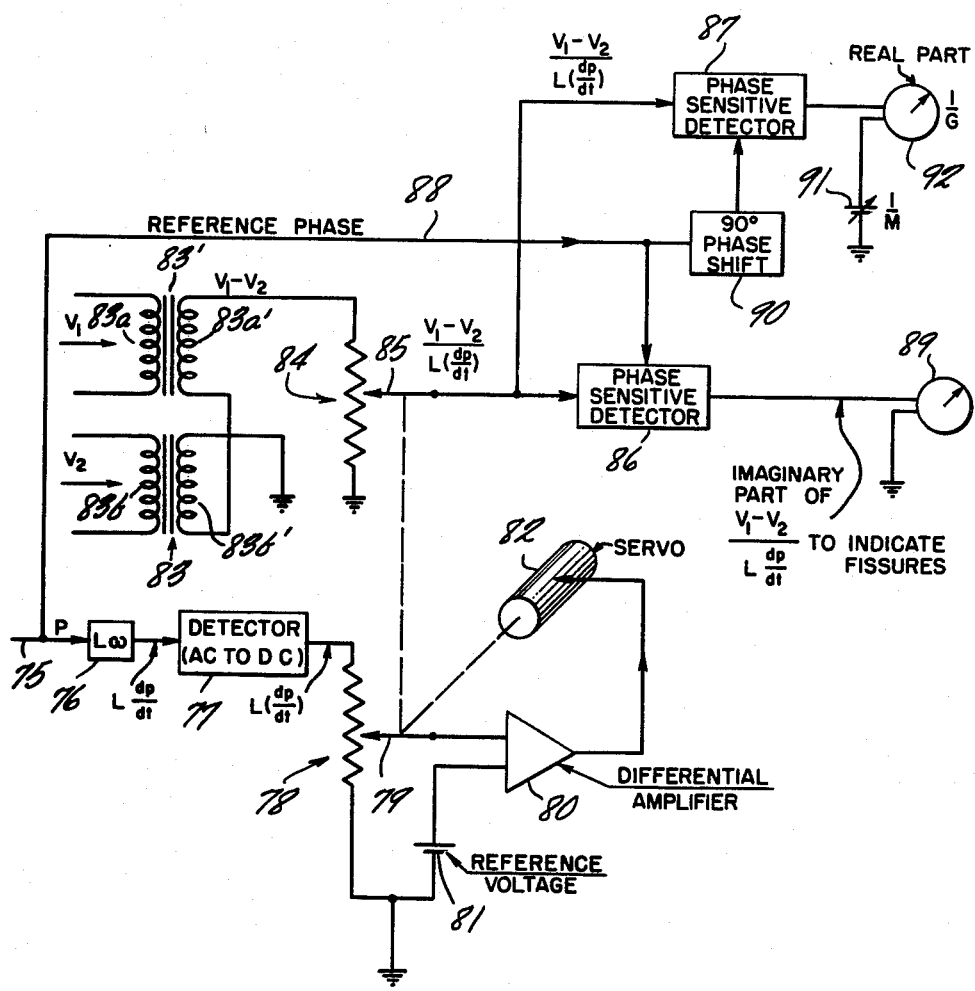
FIG. IA

INVENTOR.
ROBERT B. BLIZARD

BY
*Brumbaugh, Free, Graves & Donohue*

ATTORNEYS

United States Patent Office 3,181,645
Patented May 4, 1965

3,181,645
ACOUSTIC WELL LOGGING APPARATUS
Robert B. Blizard, Littleton, Colo., assignor to Schlumberger Well Surveying Corporation, Houston, Tex., a corporation of Texas
Original application Aug. 6, 1959, Ser. No. 832,048, now Patent No. 3,080,010, dated Mar. 5, 1963. Divided and this application July 25, 1962, Ser. No. 212,426
8 Claims. (Cl. 181—.5)

This invention relates to a method and apparatus for exploring the earth formations traversed by a bore. More particularly, it has to do with new and improved techniques and means for obtaining information about the shear modulus of earth formations traversed by a bore and for detecting the presence of lateral fissures in such formations.

This application is a division of application Serial No. 832,048, filed August 6, 1959, now Patent No. 3,080,010, granted March 5, 1963.

The shear modulus of earth formations is a parameter which is capable of affording much useful information about such formations. It is closely related to a number of factors including the formation porosity, the static pressure due to the overburden, the chemical properties of the formations, and the cementation structure.

The porosity of the earth formation is of importance in that it is a factor in estimating the reservoir capacity of hydrocarbon containing earth formations. The presence of cracks or fissures in hard earth formations which are oil bearing may be important since they allow the oil to seep into the bore which has been drilled into the earth. Therefore, the exact location of horizontal cracks or fissures in the oil bearing zones may be of great commercial importance since their productivity can often be increased by known fracturing techniques.

Therefore, it is an object of this invention to provide a new and improved method and apparatus for obtaining information about the shear modulus of elasticity of the earth formations surrounding a bore.

Another object of this invention is to provide a novel method and apparatus which will detect the presence of fissures in the earth formations surrounding a bore.

A further object of this invention is to provide a new and improved pressure wave generator for use under hydrostatic pressure.

A still further object of this invention is to provide an acoustic well logging method and apparatus of the above character which has response characteristics that are independent of the size of the bore.

Another object of the invention is to provide an acoustic well logging method and apparatus of the above character having response characteristics that are not materially influenced by the earth formations lying above and below the level being logged at any instant.

These and other objects of the invention are attained by disposing in a bore apparatus comprising pressure wave generator means and a plurality of detectors spaced apart longitudinally from each other and from the pressure wave generator means. The plurality of detectors are adapted to detect changes in specified physical characteristics of the fluid contained in the bore which are caused by the pressure field established by the pressure wave generator means and which are indicative of desired physical characteristics of the earth formations surrounding the bore.

In one embodiment of the invention, pressure waves are generated at one location in the bore and indications are obtained of fluid velocity at points spaced apart longitudinally from each other and from said one location, and a fluid pressure at a position between said points. From the indications thus obtained, the shear modulus can be readily determined. It is also possible to ascertain if fissures are present.

According to another embodiment of the invention, pressure waves are generated at one location in a bore and indications of fluid pressure are obtained at a plurality of points spaced apart from each other and from said one location. In this form of the invention, the propagation constant of the pressure waves in the bore is ascertained from the indications of fluid pressure that are obtained at the plurality of points. The shear modulus is then determined (assuming the absence of fissures) from the imaginary part of the propagation constant. The presence of fissures can be detected by large attenuation of the pressure waves as indicated by a large real part of the propagation constant.

This invention may be better understood from the following detailed description of several representative embodiments taken in conjunction with the accompanying drawings in which:

FIGURE 1A is an electrical schematic diagram of the circuit details of an exemplary embodiment of the computer shown in FIG. 1;

Figure 1:
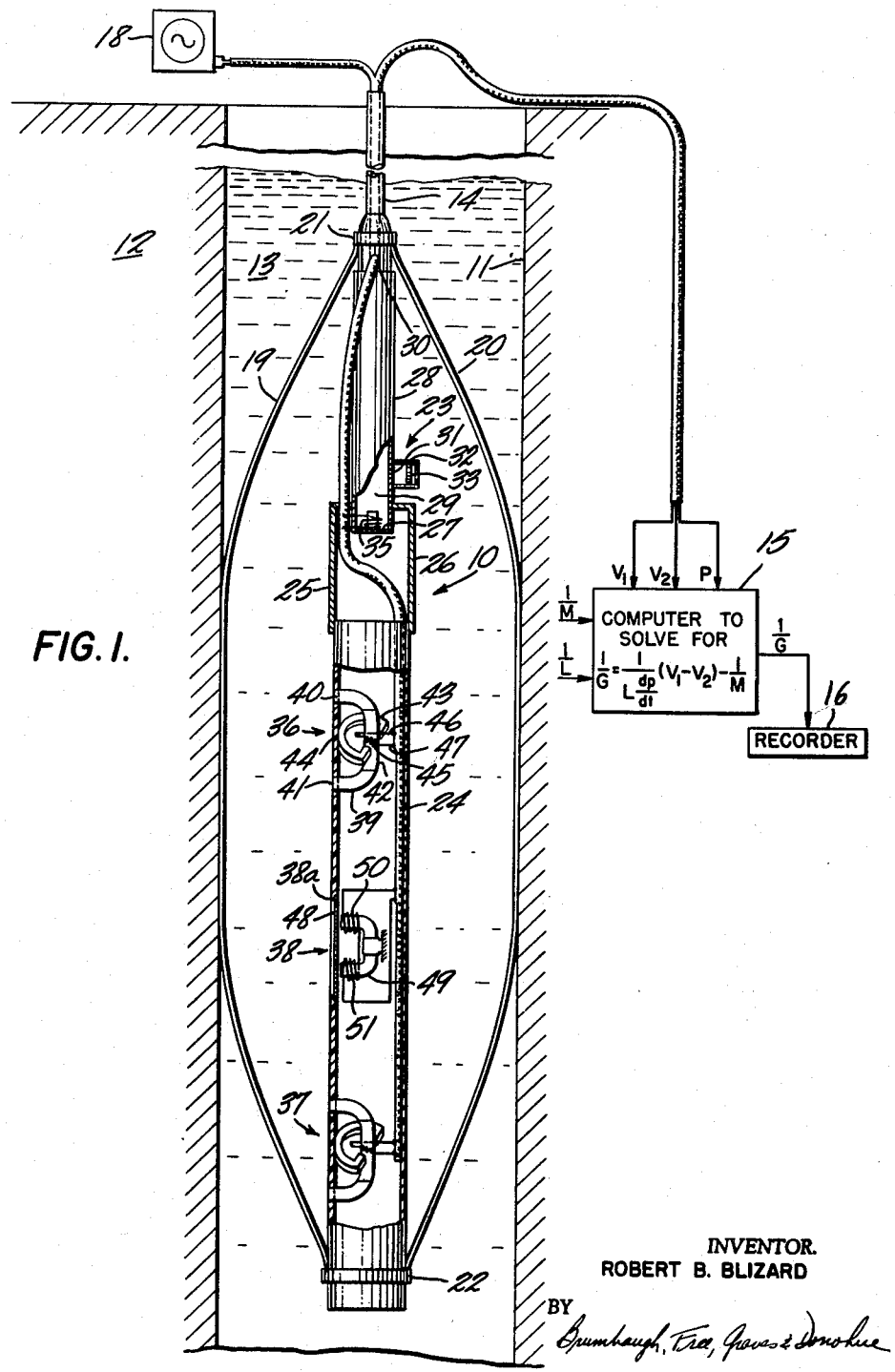
FIGURE 1 is a schematic diagram of typical well logging apparatus, partly in section, constructed according to the invention.

With reference to FIGURE 1, a support 10 is lowered into a bore 11 surrounded by earth formations 12 and containing a liquid 13. The support 10 is lowered and raised in the bore by a cable 14 which may be wound on a conventional winch (not shown) at the surface of the ground. At least three bow springs, such as springs 19 and 20, are attached to the extreme ends of the support 10 by collars 21 and 22 and maintain the support at the center of the bore.

The support 10 includes a pressure wave generator 23 which is coupled to a pressure-resistant housing 24 by suitable coupling means such as braces 25 and 26. A plurality of electrical conductors, normally contained within the cable 14 and insulated therefrom, connect a plurality of transducers carried by the housing 24 to a computer 15 and connect the generator 23 to an oscillator 18.

The pressure wave generator 23 comprises a tube 28, which may be made of metal or other rigid material, filled with a fluid 29 and closed at one end by a plate 30 and at the other end by a diaphragm 27 preferably of flexible steel. The fluid 29 filling the tube is preferably a relatively compressible fluid such as silicone oil. The diaphragm is adapted to be driven electromagnetically by a coil 35 connected to the oscillator 18 at the surface of the ground. Preferably, the column of fluid 29 in the tube 28 should resonate at the frequency of the oscillator 18. To this end, the tube should be approximately one-quarter wave length long relative to the wave length of the resonating fluid 29.

To equalize the static pressures on both sides of the diaphragm 27, a small hole 31 is provided in the tube 28 which communicates with a small cylinder 32 in which a piston 33 is slidably mounted. The piston 33 is adapted to be displaced back and forth by changes in the hydrostatic pressure in the bore as the apparatus is raised and lowered therein so that the pressures on the opposite sides of the diaphragm are equalized at all times.

The pressure-resistant housing 24 contains two longitudinally spaced apart fluid velocity detectors 36 and 37 and a fluid pressure detector 38. The fluid velocity detectors 36 and 37 are identical and may be of any suitable type such as that shown in Patent No. 2,924,289 to Maurice C. Ferre. Detectors of this type comprises a C-shaped tube 39 having two longitudinally spaced apart openings 40 and 41, communicating with the fluid 13 in the bore. The section 42 of the tube is of a nonmagnetic and electrically insulating material and is positioned between the poles of a permanent magnet 43 fastened to the housing at 44. A ribbon-type diaphragm 45, made of an electrically conductive material, is positioned at the center of the section 42 between the poles of the magnet 43.

The pressure waves in the bore fluid 13 caused by the pressure wave generator 23 create an alternating pressure difference between the two openings 40 and 41. This difference in pressure causes the fluid filling the C-shaped tube 39 to move back and forth between the two openings 40 and 41. The movement of the fluid in the tube causes the diaphragm 45 to vibrate between the poles of the magnet and generates a signal between the two terminals 46 and 47 which is a function of the fluid velocity.

The pressure detector 38 may be of the type disclosed in the United States Patent No. 2,191,120 to Slichter, for example. It comprises a diaphragm 48 which is secured in an opening 38a in the housing 24 in any suitable fluid-tight manner. Within the housing are two coils 50 and 51 which, along with a U-shaped core 49, constitute a magnetic system which will generate a signal when the diaphragm 48 vibrates. The coils 50 and 51 may be polarized with direct current or by a permanent magnet.

The two velocity detectors 36 and 37 and the pressure detector 38 are electrically connected to the computer 15, better illustrated in FIG. 1A, at the surface of the ground. The computer is adapted to determine the shear modulus G of the formations 12 and a recorder 16, connected to the output of the computer, provides a log of G versus depth in the bore.

Before discussing the operation of the apparatus of FIG. 1, it will be helpful to set forth briefly some of the theory on which the applicant's invention is based. It can readily be shown that when the fluid pressure in the bore is changed by an amount of pressure $p$, the volume $V_p$ of the section of the bore in which the change in pressure takes place is given by the relation:

$$V_p = V_0\left(1 + \frac{p}{G}\right) \quad (1)$$

where $V_0$ is the volume of the same section of the bore at the initial pressure, and G is the shear modulus of the material comprising the surrounding formation.

In a given section of the bore between, for example, detectors 36 and 37, in addition to changing the volume of the bore, any fluid pressure change inside the bore will also produce a corresponding change in the volume of a given mass of fluid in the bore. Therefore, when the pressure in a section of the bore increases, there will flow into this section a volume of bore fluid equal to the sum of the increase in the volume of the section of the bore and the decrease in the volume of fluid originally in the aforesaid section of the bore. The volume V of the incoming fluid is given by the relation:

$$V = V_0 p\left[\frac{1}{G} + \frac{1}{M}\right] \quad (2)$$

where M is the volume modulus of the fluid in the bore.

By differentiating Equation 2, the rate of influx of fluid into the section between the velocity detectors 36 and 37 is shown to be:

$$\frac{dV}{dt} = V_0 \frac{dp}{dt}\left[\frac{1}{G} + \frac{1}{M}\right] \quad (3)$$

In the form of the invention shown in FIG. 1, the rate of influx, $$\frac{dV}{dt}$$

of the fluid entering the section between the two fluid velocity detectors 36 and 37 as a result of an increase of fluid pressure in the section is given by the relation:

$$\frac{dV}{dt} = A(v_1 - v_2) \quad (4)$$

where $v_1$ and $v_2$ are the fluid velocities indicated by the two fluid velocity detectors 36 and 37 and A is the cross-sectional area of the bore.

In the absence of fissures, the volume of the space occupied by the section of the bore between the two fluid velocity detectors is given by the formula $V_0 = LA$, where L is the distance between the two fluid velocity detectors and A is the cross-sectional area of the bore. Substituting LA for $V_0$ in Equation 3 and then combining Equations 3 and 4, the following relation is obtained for the reciprocal of the shear modulus:

$$\frac{1}{G} = \left[\frac{1}{L\frac{dp}{dt}}(v_1 - v_2)\frac{1}{M}\right] \quad (5)$$

It will be apparent, therefore, that the shear modulus G of the formation surrounding the bore at any depth can be ascertained by measuring the values $v_1$, $v_2$ and $p$ at that depth, and introducing these values into a computer, such as computer 15, adapted to determine G according to Equation 5.

If fissures are present between the receivers, a larger volume of fluid will be available for compression in the section of the bore than would otherwise be present so that the shear modulus as computed from Equation 5 will have an abnormally low value as compared to the value expected if no fissures were present. Abnormally low values of the calculated shear modulus, therefore, may be taken as indicating that fissures are present.

While Equation 5 may be solved manually, it is preferred to use computer means for this purpose. An example of a computer found suitable for this purpose is illustrated schematically in FIG. 1A.

A voltage representative of the pressure $p$ is connected by a conductor 75 to a suitable multiplier-differentiator circuit 76 that differentiates the voltage signal $p$, which is varying at an angular frequency $\omega$, as a function of time $(t)$ and multiples the resultant signal by the factor L to produce a voltage proportional to $$L\frac{dp}{dt}$$

This voltage is converted to a D.C. voltage proportional to $$L\frac{dp}{dt}$$

by a detector 77. A potentiometer 78 has its resistance connected betwen ground and the output of the detector 77 and its slider 79 connected to a differential amplifier 80. A source of electric potential 81 is also connected between the amplifier 80 and ground and supplies to the amplifier 80 a reference voltage of say 1 volt in opposition to the voltage between the slider 79 and ground. The output of the amplifier 80 is connected to drive a servo motor 82 that is mechanically coupled to the arm 79 to adjust the position of the latter so as to maintain substantially zero voltage in the input circut to the amplifier 80.

Voltages representative of the velocities $v_1$ and $v_2$ are connected to the primary windings 83a and 83b of transformers 83 and 83', the secondary windings 83a' and 83b' of which are connected in series opposition to provide an output voltage proportional to $v_1 - v_2$. This voltage is connected across the resistance of a potentiometer 84 having a slider 85 that is mechanically coupled to the slider 79 of the potentiometer 78.

The potentiometers 78 and 84 have the same ohmic resistance R. Since the servo motor 82 continuously adjusts the position of the slider 79 to maintain a reference voltage value of 1 volt between it and ground, in which case $$L\frac{dp}{dt}R=1 \text{ or } R=\frac{1}{L\frac{dp}{dt}}$$

then the voltage between the arm 85 and ground is equal to $$\frac{v_1-v_2}{L\frac{dp}{dt}}$$

This voltage is connected to two phase sensitive detectors 86 and 87. The detector 86 also receives voltage of a reference phase from the conductor 75 over the conductor 88 and provides an output to a meter 89 to indicate the imaginary part of $$\frac{v_1-v_2}{L\frac{dp}{dt}}$$

The reference voltage from the conductor 88 is shifted 90° in phase by a conventional phase shifting device 90 and supplied as a phase reference voltage to the detector 87. Hence, the output of the detector 87 is proportional to the real part of $$\frac{v_1-v_2}{L\frac{dp}{dt}}$$

This voltage is connected in series opposition with a variable voltage source 91 set to the value of $$\frac{1}{M}$$

and the value of the difference voltage, which is representative of $$\frac{1}{G}=\frac{v_1-v_2}{L\frac{dp}{dt}}-\frac{1}{M}$$

is indicated by a meter 92. The meters 89 and 92 may, of course, be adapted to provide a permanent record of these values.

Figure 2:
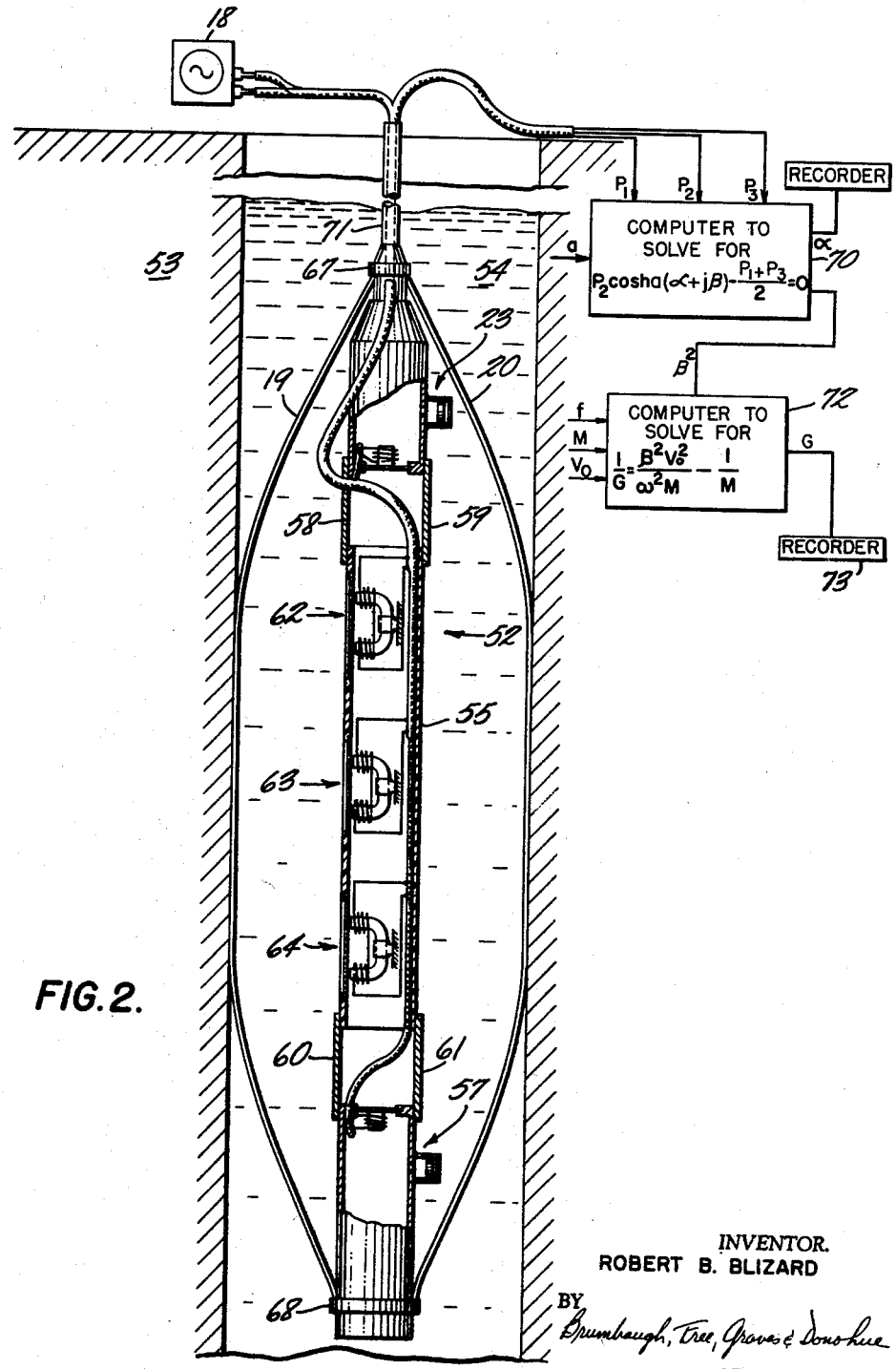
FIGURE 2 illustrates schematically another embodiment, partly in section, of the invention.

In the embodiment of the invention shown in FIG. 2, information about the shear modulus of the formations 53 is obtained by creating a fluid pressure field in the bore 54 and obtaining indications of fluid pressure at a plurality of nearby longitudinally spaced apart locations.

The apparatus 52 is lowered into the bore 54 and includes two fluid pressure generators 23 and 57 which are attached to a housing 55 by a plurality of braces 58–61. The apparatus is maintained centered in the bore by at least three springs, such as springs 19 and 20. The housing 55 contains three longitudinally spaced apart fluid pressure detectors 62, 63 and 64 which are electrically connected to computers 70 and 72 at the surface of the ground by conductors usually contained within the supporting cable 71 and insulated therefrom. The coils of the generators 23 and 57 are connected to be driven in synchronism by an oscillator 18.

The two pressure wave generators 23 and 57 are preferably positioned approximately one-half wave length apart with the three pressure detectors located symmetrically between them. The distance between the pressure wave generators and the nearest pressure detector is such that only longitudinally traveling waves are present in the region of the detectors. For example, this spacing may be in the neighborhood of at least two bore diameters.

As an aid in understanding the operation of the form of the invention shown in FIG. 2, a brief resume of the underlying theory is set forth below.

If the earth formations surrounding the bore walls are elastic, the phase velocity of a low frequency pressure wave in the bore will be less than the phase velocity in a bore having rigid walls, and in the presence of fissures, considerable attenuation can be expected. The amount by which the velocity will be decreased is dependent in part upon the shear modulus of the earth formations, and, therefore, in the absence of fissures, the nature of the formations can be determined by obtaining a log of the shear modulus versus depth in the bore.

The shear modulus G can be calculated from the formula:

$$\frac{1}{G}=\frac{\beta^2 v_0^2}{\omega^2 M}-\frac{1}{M} \quad (6)$$

where M is the adiabatic volume modulus of the bore fluid, $v_0$ is the pressure wave velocity in the bore fluid if the side walls of the bore are assumed to be infinitely rigid, $\omega$ is the angular frequency, and $\beta$ is the phase constant of the pressure waves in the bore. The modulus M can be measured at the surface and the velocity $v_0$ can be determined from the formula:

$$v_0=\sqrt{\frac{M}{\rho}} \quad (7)$$

where $\rho$ is the density of the bore fluid which can also be measured at the surface. Therefore, if $\beta$, the phase constant of the pressure waves in the bore, can be ascertained, the shear modulus of the earth formations can also be determined.

The phase constant $\beta$ may be calculated when the propagation constant $k$ of the pressure wave is known since they are related by the formula:

$$k=\alpha+j\beta \quad (8)$$

where $\alpha$ is the real part and represents the attenuation of the wave, and $\beta$ is the imaginary part and represents the phase shift of the wave.

For convenience, the conventional complex notation for harmonically varying parameters may be employed as in the following equation:

$$p(t)=RPe^{j\omega t} \quad (9)$$

where the pressure $p$, as a function of time ($t$) at a particular point in the bore, is equal to the real part R of a complex pressure amplitude P times the customary exponential expression $e^{j\omega t}$.

In the region between the two pressure wave generators 23 and 57, the complex pressure amplitude P is a function of a distance $x$ measured along the bore from the middle detector 63, and is, in fact, equal to the sum of the two terms representing waves traveling in opposite directions. Thus, the following equation:

$$P(x)=P_+ e^{-kx}+P_- e^{kx} \quad (10)$$

may be written where $P_+$ and $P_-$ are the complex pressure amplitudes for the waves traveling in the positive and the negative directions, respectively. Equation 10 may be solved for the pressure at the middle detector 63 by setting $x$ equal to zero, thus:

$$P_2=P_++P_- \quad (11)$$

Likewise, to solve for $P_1$ and $P_3$, at the end detectors 62 and 64, $x$ is set equal to $a$ and $-a$, respectively, so that:

$$P_1=P_+ e^{-ka}+P_- e^{ka} \quad (12)$$

and $$P_3=P_+ e^{ka}+P_- e^{-ka} \quad (13)$$

where $a$ is the distance between adjacent pressure detectors.

By combining Equations 12 and 13 and using the relation between hyperbolic and exponential functions, the following relation is obtained:

$$\frac{(P_1+P_3)}{2}=(P_++P_-)\cosh ka \quad (14)$$

Dividing Equation 14 by Equation 11 and rearranging the terms provides the following relation:

$$\cosh ka = \frac{P_1 + P_3}{2P_2} \quad (15)$$

The complex pressures $P_1$, $P_2$ and $P_3$ are transformed into complex voltages by the three pressure detectors 62, 63 and 64 and the real and the imaginary parts of the propagation constant $k$ are then determined at the surface of the ground, preferably by an electric computer 70 designed to solve Equation 15, and a record is made of the real part $\alpha$ versus depth. This log indicates the presence of fissures by an abnormally high value of $\alpha$ because the presence of fissures causes high attenuation of the pressure waves. The imaginary part $\beta$ is delivered to a second computer 72 which is designed to solve Equation 6 for the shear modulus G. A log of the shear modulus G versus depth in the absence of fissures is produced by a recorder 73.

Figure 3:
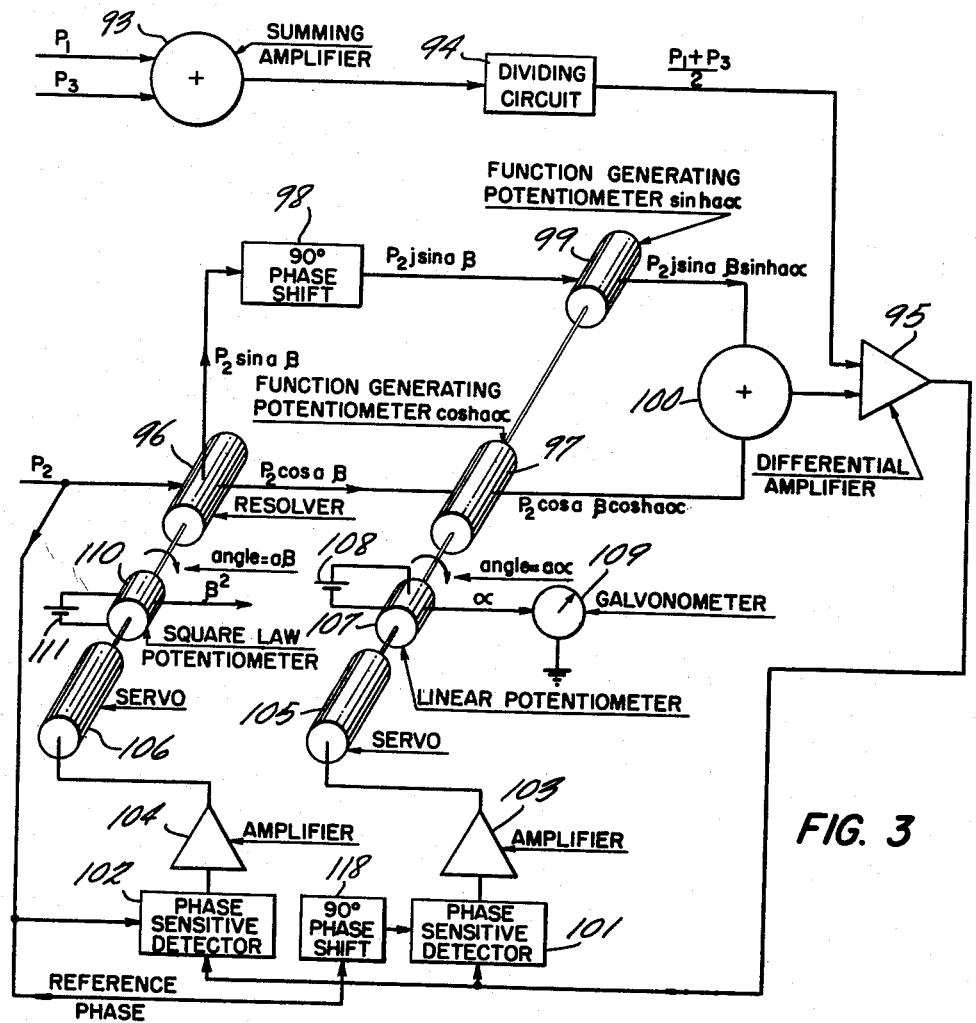
FIGURES 3 and 4 are schematic diagrams of exemplary embodiments of the computers shown in FIG. 2.
Figure 4:
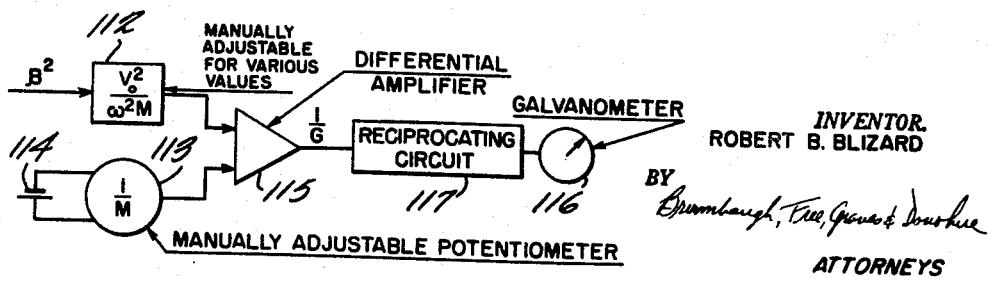

FIGS. 3 and 4 are schematic diagrams of computers designed to solve Equations 6 and 15 for $\alpha$, $\beta$ and G using the apparatus shown in FIG. 2. With reference to FIG. 3, the voltages representing the pressures $P_1$ and $P_3$ are added together by a summing amplifier circuit 93 and the sum of the voltages is divided by two by a dividing circuit 94. The resulting voltage, proportional to the quantity $$\frac{P_1 + P_3}{2}$$

is fed into a differential amplifier circuit 95.

A voltage representing the pressure $P_2$ is connected to the winding of a conventional resolver 96 that has its rotor set (as will be seen) to the angle $a\beta$. The output voltage representing the quanity $P_2 \cos a\beta$ from the resolver 96 is connected to a function generating potentiometer 97 that multiplies the input voltage by the quantity $\cosh a\alpha$. Thus, its output is proportional to the quantity $P_2 \cos a\beta \cosh a\alpha$ which is fed into an adding circuit 100. The output voltage representing $P_2 \sin a\beta$ from the resolver 96 is shifted 90° in phase by a conventional phase shifting circuit 98 which is connected to a potentiometer 99 that multiplies the output of circuit 98 $\sinh a\alpha$. The voltage output representing the quantity $P_2 j \sin a\beta \sinh a\alpha$ from the potentiometer 99 is also fed into the adding circuit 100.

The sum of the two voltages entering the adding circuit 100 is equal to $$P_2 \cos a\beta \cosh a\alpha + P_2 j \sin a\beta \sinh a\alpha$$

which is trigonometrically identical to $P_2 \cosh a(\alpha + j\beta)$. The quantity $\cosh (\alpha + j\beta)$ will be recognized as the left side of the Equation 15 when it is recalled that $$k = (\alpha + j\beta)$$

The output of the adding circuit 100 is fed into the amplifier 95 along with the output from the dividing circuit 94. It can be seen that the two inputs to the amplifier 95 represent the two sides of the Equation 15.

The output from the amplifier 95 is connected to the two phase sensitive detectors 101 and 102. The output of the detector 101 is a signal whose amplitude is proportional to that of the output of amplifier 95 which is 90° out of phase with the pressure $P_2$. The output of the detector 102 is a signal whose amplitude is proportional to that of the output of amplifier 95 which is made 90° out of phase with the pressure $P_2$ by a 90° phase shifting network 118. The outputs of detectors 101 and 102 are amplified by two amplifiers 103 and 104 and drive two servo motors 105 and 106. The servo motor 105 is connected to drive the two potentiometers 97 and 99, and the servo motor 106 drives the resolver 96. It can be seen that a phase difference between the output voltage of the amplifier 95 and the input voltage representing the pressure $P_2$ will adjust the setting of the resolver and the potentiometers 97 and 99 until the unbalance is corrected. The rotor angle of the servo motor 105 represents the angle $a\alpha$ and the rotor angle of the servo motor 106 represents the angle $a\beta$. A linear potentiometer 107 is coupled to the rotor of the servo motor 105 and, with the voltage source 108, produces a voltage representative of the quantity $\alpha$ which is indicated by a galvanometer 109. Since the quantity $\beta^2$ is required in a subsequent computation, a square law potentiometer 110 is connected to the rotor of the servo motor 106 and, along with a voltage source 111, produces a voltage representative of the quantity $\beta^2$.

The voltage representing the quantity $\beta^2$ is employed by the computer illustrated in FIG. 4 to determine the shear modulus G of the earth formations according to the Equation 6. This voltage is fed into a manually adjustable circuit 112 that multiplies the input voltage by the quantity $$\frac{v_0^2}{\omega^2 M}$$

where $v_0$ is the pressure wave velocity in a bore with rigid walls, $\omega$ is the angular frequency and M is the adiabatic volume modulus. A manually aljustable potentiometer 113 and a voltage source 114 produce a voltage proportional to the quantity $$\frac{1}{M}$$

which is fed into a differential amplifier 115 along with the voltage output from the circuit 112. The output voltage from the amplifier 115 is proportional to the quantity $$\frac{\beta^2 v_0^2}{\omega^2 M} - \frac{1}{M}$$

which, according to Equation 6, is equal to $$\frac{1}{G}$$

The reciprocal of this quantity is given at the output of the inverting circuit 117 and is indicated on a galvanometer 116. The output of the amplifier 115 could, if desired, be connected directly to an indicator to indicate the value of $$\frac{1}{G}$$

The indicators 109 and 116, FIGS. 3 and 4, could of course be adapted to provide a permanent record.

If a detailed log of the shear modulus versus the depth is to be obtained, the phase velocity of the pressure waves must be determined over a short interval. Also, a wave length of at least 5 and preferably 10 times the maximum bore diameter is desirable so that the pressure wave velocity will be independent of the bore diameter. To satisfy these requirements, the phase velocity must be measured over a distance which is substantially smaller than a wave length.

One pressure wave generator may be used instead of two. However, if one generator is used, the two pressures $P_1$ and $P_3$, which must be averaged in order to compute $k$, will generally be out of phase. If the phase difference is in the neighborhood of 180°, the difficult task of finding a small difference between two large quantities is faced. By providing two generators symmetrically disposed above and below the receivers, the pressures $P_1$ and $P_3$ will be nearly in phase and nearly equal. Furthermore, if the two generators are spaced one-half wave length apart and are driven in synchronism, their fields will nearly cancel both above and below the transmitters so that little sound will be reflected from the discontinuities in the bore. Also, the pressure wave pattern will be symmetrical about the center of the detectors. A further advantage of the half-wave separation of the two generators is that the power radiated up and down the bore will be greatly reduced, thus reducing the power requirements of the generators.

It can be seen, therefore, that a novel and useful well logging apparatus has been provided which enables much useful information to be obtained about the shear modulus of the earth formations surrounding the bore and about fissures that may be present in the earth formations. With the well logging apparatus described above, readings can be obtained which are independent of the bore diameter and which are not affected by discontinuities in the bore either above or below the detecting apparatus.

While particular embodiments of the present invention have been shown and described for purposes of illustration, it is apparent that changes and modifications may be made without departing from this invention in its broader aspects. Therefore, the invention described herein is not to be construed as limited to the specific embodiments described but is intended to encompass all modifications thereof coming within the scope of the following claims.

I claim:

1. Apparatus for exploring earth formations traversed by a bore filled with a fluid comprising a support adapted to be lowered into said bore, pressure wave generator means carried by said support for establishing a pressure wave in said fluid, at least three pressure detectors also carried by said support in longitudinally spaced apart relation to each other and to said generator means for providing signals indicative of the fluid pressures at said respective detectors, and computer means responsive to said signals from said plurality of pressure detectors for providing an output signal representative of the shear modulus of the earth formations surrounding said bore.

2. Apparatus for exploring earth formations traversed by a bore filled with a fluid comprising a support adapted to be lowered into said bore, a plurality of pressure wave generator means carried by said support for establishing a pressure wave of a given frequency in said fluid, at least three pressure detectors also carried by said support in longitudinally spaced apart relation to each other and to said plurality of pressure wave generator means, said plurality of generator means being spaced approximately one-half wave length distant from each other relative to the wave length of the pressure wave in the fluid in the bore at the frequency impressed by said generator means, said at least three pressure detectors being mounted between said plurality of generator means and operative to provide signals indicative of the fluid pressures at said respective detectors, and computer means responsive to said signals from said pressure detectors for providing an output signal representative of the shear modulus of the earth formations surrounding said bore.

3. Apparatus for exploring earth formations traversed by a bore as in claim 2 wherein each of said plurality of pressure wave generators is comprised of a cylindrical tube containing a resonant column of fluid, a plate closing said tube at one end and a diaphragm closing the opposite end of said tube, means for driving said diaphragm to generate a pressure wave in the fluid in said bore and means to equalize the static pressures on both sides of said diaphragm.

4. Apparatus for exploring earth formations traversed by a bore as in claim 2 wherein said computer means responsive to said signals from said plurality of pressure detectors comprises a first computer arranged to receive and combine said signals to provide a voltage output signal proportional to propagation constant $\beta$ in accordance with the relation:

$$P_2 \cosh a(\alpha + j\beta) - \frac{P_1 + P_3}{2} = 0$$

and a second computer arranged to receive and modify said voltage output from said first computer in accordance with the relation:

$$\frac{1}{G} = \frac{\beta^2 v_0^2}{\omega^2 M} - \frac{1}{M}$$

where $a$ is the distance between adjacent pressure detectors, $\alpha$ is the attenuation constant and $\beta$ is the propagation constant of the pressure fields set up by said plurality of pressure wave generators, $P_1$, $P_2$ and $P_3$ are the pressures measured by said pressure detectors, G is the shear modulus, $\omega$ is the angular frequency of said pressure wave generator, M is the adiabatic volume modulus of the fluid filling said bore and $v_0$ is the ordinary sound velocity in the fluid.

5. Apparatus for exploring earth formations traversed by a bore as in claim 4, wherein said first computer is connected to said plurality of detectors to receive first, second and third input signals representing the pressures $P_1$, $P_2$ and $P_3$, respectively, said computer including means responsive to said first and third input signals for adding said first and third input signals together and dividing by two, resolver means responsive to said second input signal for dividing said second input signal into two portions and for producing signals proportional to the quantities $P_2 \cos a\beta$ and $P_2 \sin a\beta$, first means responsive to said resolver means for multiplying the signal quantity $P_2 \cos a\beta$ by the factor $\cosh a\alpha$ to produce a signal output, second means responsive to said resolver for shifting the phase of the signal quantity $P_2 \sin a\beta$ by an angle of 90° and for multiplying the same by the factor $\sinh a\alpha$ to produce a signal output, adder means responsive to the outputs of said first and second means for adding the signal quantities $P_2 j \sin a\beta \sinh a\alpha$ and $P_2 \cos a\beta \cosh a\alpha$ together to produce a signal output, differential means responsive to said adder means signal output and to the signal output from said means for adding said first and third inputs and dividing the same by two for producing an output signal proportional to the difference between the signal quantities $$\frac{P_1 + P_2}{2}$$

and $P_2 \cos a\beta \cosh a\alpha + P_2 j \sin a\beta \sinh a\alpha$, feedback means responsive to the phase of said output signal from said differential means and to the phase of said second input signal for adjusting the values of the quantities $a\beta$ and $a\alpha$, means responsive to said feedback means to indicate the value of the quantity $\alpha$, and means responsive to said feedback means to indicate the value of the quantity $\beta$.

6. Apparatus for exploring earth formations traversed by a bore as in claim 4 wherein said second computer comprises first adjustable means responsive to said voltage output signal from said first computer for multiplying the square of said voltage output signal $\beta$ by the factor $$\frac{v_0^2}{\omega^2 M}$$

to produce an output signal second adjustable means for generating the signal quantity $$\frac{1}{M}$$

to produce an output signal, differential means responsive to said first and second adjustable means output signals for providing a signal output proportional to the difference between the signal quantities $$\frac{1}{M} \text{ and } \frac{\beta^2 v_0^2}{\omega^2 M}$$

and an indicator responsive to said differential means for indicating the value of said difference.

7. A method for exploring earth formations traversed by a bore containing a fluid medium, comprising the steps of inducing a pressure wave in the fluid medium at a first location in the bore, simultaneously obtaining indications of the instantaneous pressure of said medium at at least three other locations in the bore spaced apart from each other and from said first location in a longitudinal direction along said bore, and combining said pressure indications to produce a signal representative of the shear modulus of the earth formations surrounding the bore.

8. A method for exploring earth formations traversed by a bore containing a fluid medium, comprising the steps of inducing low frequency pressure waves in the medium at first and second locations spaced apart longitudinally in the bore, said locations being spaced apart approximately one-half wave length of the wave length of the pressure waves induced in said medium, simultaneously obtaining indications of the instantaneous pressure of the medium at at least three other locations in the bore symmetrically placed between said first and second locations but spaced apart therefrom and from each other in a longitudinal direction along said bore, the distances between said first and second locations and said three other locations being such that only waves traveling longitudinally in said bore are present in the region of said at least three other locations, and combining said pressure indications to produce a signal representative of the shear modulus of the earth formations surrounding the bore.

References Cited by the Examiner
UNITED STATES PATENTS

| | | | |
|---|---|---|---|
| 2,191,120 | 2/40 | Slichter | 181—.53 |
| 2,708,485 | 5/55 | Vogel | 181—.53 |
| 2,784,796 | 3/57 | Overton | 181—.53 |
| 2,809,290 | 10/57 | Kee | 235—193 |
| 2,924,289 | 2/60 | Ferre | 181—.53 |

OTHER REFERENCES

Giant Brains, by Edmund Berkeley (1950), QA-75-B4. Pages 100-103 principally relied upon.

SAMUEL FEINBERG, *Primary Examiner.*
CHESTER L. JUSTUS, *Examiner.*